(12) United States Patent   (10) Patent No.: US 7,427,945 B2
Stephens   (45) Date of Patent: Sep. 23, 2008

(54) POSITIONING SYSTEM WITH CO-POLARIZED AND CROSS-POLARIZED MAPPING

(75) Inventor: Scott Adam Stephens, Phoenix, AZ (US)

(73) Assignee: Navcom Technology, Inc., Torrance, CA (US)

( * ) Notice: Subject to any disclaimer, the term of this patent is extended or adjusted under 35 U.S.C. 154(b) by 365 days.

(21) Appl. No.: 11/103,962

(22) Filed: Apr. 11, 2005

(65) Prior Publication Data

US 2005/0225482 A1   Oct. 13, 2005

Related U.S. Application Data

(63) Continuation-in-part of application No. 10/614,097, filed on Jul. 3, 2003, now Pat. No. 7,250,901.

(51) Int. Cl.
*G01S 13/08* (2006.01)
*H01Q 15/00* (2006.01)

(52) U.S. Cl. ............... 342/146; 342/5; 342/126; 342/188

(58) Field of Classification Search ........ 342/5, 342/126, 146, 188, 191, 463
See application file for complete search history.

(56) References Cited

U.S. PATENT DOCUMENTS

| | | | |
|---|---|---|---|
| 3,001,193 A | 9/1961 | Marie | 343/100 |
| 3,268,891 A | 8/1966 | Waban | 343/5 |
| 4,104,634 A | 8/1978 | Gillard et al. | |
| 4,297,700 A * | 10/1981 | Nard et al. | 342/125 |
| 4,710,020 A | 12/1987 | Maddox et al. | |
| 4,829,442 A | 5/1989 | Kadonoff et al. | |
| 4,873,449 A | 10/1989 | Paramythioti et al. | |
| 5,375,059 A | 12/1994 | Kyrtsos et al. | |

(Continued)

FOREIGN PATENT DOCUMENTS

DE   19910715 A1   9/2000

(Continued)

OTHER PUBLICATIONS

International Search Report for International Application No. PCT/US2005/009833 mailed Aug. 21, 2006.

(Continued)

*Primary Examiner*—Isam Alsomiri
(74) *Attorney, Agent, or Firm*—Morgan, Lewis & Bockius LLP (57) ABSTRACT

A local positioning system using co-polarized and cross-polarized radar mapping is provided. In one embodiment of the method, at least a first electromagnetic pulse having a first polarization is transmitted. A first return signal preferentially having the first polarization is received over a respective period of time. The first return signal is processed so as to isolate a first return pulse corresponding to an object within a radar detection area of the positioning system. At least a second electromagnetic pulse having the first polarization is also transmitted. A second return signal preferentially having a second polarization is received over a respective period of time. The second return signal is processed so as to isolate a second return pulse corresponding to the object. A characteristic of the object is determined in accordance with a relative signal strength of the first return pulse and the second return pulse.

22 Claims, 5 Drawing Sheets

U.S. PATENT DOCUMENTS

| | | | |
|---|---|---|---|
| 5,390,125 A | 2/1995 | Sennott et al. | |
| 5,406,290 A | 4/1995 | James et al. | 342/119 |
| 5,438,517 A | 8/1995 | Sennott et al. | |
| 5,483,241 A | 1/1996 | Waineo et al. | |
| 5,552,787 A | 9/1996 | Schuler et al. | 342/25 |
| 5,572,427 A | 11/1996 | Link et al. | |
| 5,610,815 A | 3/1997 | Gudat et al. | |
| 5,640,323 A | 6/1997 | Kleimenhagen et al. | |
| 5,657,226 A | 8/1997 | Shin et al. | |
| 5,657,317 A | 8/1997 | Mahany et al. | |
| 5,874,918 A | 2/1999 | Czarnecki et al. | |
| 5,933,079 A | 8/1999 | Frink | |
| 5,982,164 A | 11/1999 | Czarnecki et al. | |
| 5,982,329 A | 11/1999 | Pittman et al. | 343/700 |
| 5,986,602 A | 11/1999 | Frink | |
| 6,011,974 A | 1/2000 | Cedervall et al. | |
| 6,072,421 A | 6/2000 | Fukae et al. | |
| 6,150,979 A * | 11/2000 | Tsui | 342/357.08 |
| 6,424,264 B1 | 7/2002 | Giraldin et al. | |
| 6,427,079 B1 | 7/2002 | Schneider et al. | |
| 6,459,966 B2 | 10/2002 | Nakano et al. | |
| 6,489,917 B2 | 12/2002 | Geisheimer et al. | |
| 6,525,688 B2 | 2/2003 | Chou et al. | |
| 6,556,942 B1 | 4/2003 | Smith | |
| 6,608,593 B2 | 8/2003 | Holt | |
| 6,720,935 B2 | 4/2004 | Lamensdorf et al. | |
| 2001/0051527 A1 | 12/2001 | Kuwahara et al. | |
| 2003/0005030 A1 | 1/2003 | Sutton et al. | |
| 2003/0007473 A1 | 1/2003 | Strong et al. | |

FOREIGN PATENT DOCUMENTS

| | | |
|---|---|---|
| EP | 0308585 A2 | 3/1989 |
| EP | 0325539 A1 | 7/1989 |
| EP | 0961134 A1 | 12/1999 |
| GB | 2258577 A | 2/1993 |
| WO | PCT/US2004/021366 | 12/2004 |

OTHER PUBLICATIONS

Edelsbrunner, H., et al., "Quadratic Time Algorithm for the Minmax Length Triangulation," *Proceedings of the 32nd Annual Symposium on Foundations of Computer Science*, San Juan, Puerto Rico, 1999, pp. 414-423.

Afsar, M.N., et al., "A New Wideband Cavity-Backed Spiral Antenna," *Proceedings of the 2001 IEEE Antennas and Propagation Society Int'l Symposium*, vol. 4, 2001, pp. 124-127.

Michelson, D.G., et al., "Use of Circular Polarization in a Marine Radar Positioning System," *Remote Sensing: An Economic Tool for the Nineties*, IGARSS '99, Jul. 10-14, 1999.

"Polarimetric Parameters," MacDonald Dettwiler & Assoc. and RADARSAT Int'l, www.radarsat2.info/polarimetry/rs2.sartek_terms1.pdf, Dec. 19, 2003.

\* cited by examiner

POSITIONING SYSTEM WITH CO-POLARIZED AND CROSS-POLARIZED MAPPING

This application is a continuation-in-part of U.S. patent application Ser. No. 10/614,097, filed Jul. 3, 2003, now U.S. Pat. No.7,250,901. U.S. patent application Ser. No. 10/614,097 is incorporated herein by reference in its entirety.

RELATED APPLICATIONS

The following applications are related to the current application and are hereby incorporated by reference:

U.S. patent application Ser. No. 11/103,964. filed Apr. 11, 2005, entitled "Improved Radar System for Improved Positioning";

U.S. patent application Ser. No. 11/103,965, filed Apr. 11, 2005, entitled "Positioning System with a Sparse Antenna Array";

U.S. patent application Ser. No. 11/103,950, filed Apr. 11, 2005, entitled "Positioning System with Intentional Multi-Path Signal";

U.S. patent application Ser. No. 11/104,007, filed Apr. 11, 2005, "entitled "Decoherence Plate for Use in a Communications System".

FIELD OF THE INVENTION

The present invention relates generally to positioning systems and more specifically, to a system and method for determining the position of an object in relation to a positioning system using co-polarized and cross-polarized mapping.

BACKGROUND OF THE INVENTION

Local positioning systems are becoming an important enabler in mobile devices requiring navigation capabilities, especially in applications of autonomous vehicles and precision construction tools. Global positioning systems such as GPS provide only medium accuracy position information, usually no better than 10 cm, and require a clear view of the sky to near the horizon. Local positioning systems, with either active or passive components distributed in a working volume, can allow much more accurate positioning (e.g., positioning accuracy greater than 1 cm), and allow the user to expand the system as necessary to operate in even the most complex enclosed geometries.

Conventional local positioning systems include acoustic and laser ranging systems. Acoustic systems typically use transponder beacons to measure range within a network of devices, some of which are fixed to form the local coordinate system.

Unfortunately, because of the properties of sound propagation through air, acoustic systems can only measure range to accuracies of a centimeter or more, and only over relatively short distances. Local positioning systems based on lasers utilize measurements of both the angle and range between a device and one or more reflective objects, such as prisms, to triangulate or trilateralate the position of the device. However, laser systems currently employ expensive pointing mechanisms that can drive the system cost to $30K or more.

A relatively low-cost (e.g., under $2000) local positioning system able to determine 2D or 3D positions to accuracies of a few millimeters would enable a large set of potential products, in such application areas as precision indoor and outdoor construction, mining, precision farming and stadium field mowing and treatment. The present invention overcomes the cost and accuracy limitations of conventional local positioning systems.

SUMMARY

The system and method of radar mapping provide a low-cost, yet highly accurate, local positioning system.

In one embodiment of the method, a first electromagnetic pulse having a carrier signal frequency and a first polarization is transmitted. A first return signal is received over a respective period of time. The first return signal preferentially has the first polarization. The first return signal includes a first return pulse from an object within a radar detection area of the positioning system. The first return signal is processed so as to isolate the first return pulse from the first return signal.

A second electromagnetic pulse having the carrier signal frequency and the first polarization is transmitted. A second return signal is received over a respective period of time. The second return signal preferentially has a second polarization. The second return signal includes a second return pulse from the object within the radar detection area of the positioning system. The second return signal is processed so as to isolate the second return pulse from the second return signal. A characteristic of the object is determined in accordance with a relative signal strength of the first return pulse and the second return pulse.

In some embodiments, the first polarization is right-hand circular polarization and the second polarization is left-hand circular polarization. In some embodiments, the first polarization is left-hand circular polarization and the second polarization is right-hand circular polarization.

In one embodiment of the system, a device is configured to transmit a first electromagnetic pulse having a carrier signal frequency and a first polarization. The device is configured to receive a first return signal including a first return pulse from an object within a radar detection area of the positioning system over a respective period of time. The first return signal preferentially has the first polarization. The device is configured to process the first return signal so as to isolate the first return pulse from the first return signal.

The device is also configured to transmit a second electromagnetic pulse having the carrier signal frequency and the first polarization. The device is configured to receive a second return signal including a second return pulse from the object over a respective period of time. The second return signal received preferentially has a second polarization. The device is configured to process the second return signal so as to isolate the second return pulse from the second return signal. The device is configured to determine a characteristic of the object in accordance with a relative signal strength of the first return pulse and the second return pulse.

In some embodiments, the first polarization is right-hand circular polarization and the second polarization is left-hand circular polarization. In some embodiments, the first polarization is left-hand circular polarization and the second polarization is right-hand circular polarization.

BRIEF DESCRIPTION OF THE DRAWINGS

Additional objects and features of the invention will be more readily apparent from the following detailed description and appended claims when taken in conjunction with the drawings.

Like reference numerals refer to corresponding parts throughout the several views of the drawings.

DESCRIPTION OF EMBODIMENTS

Reference will now be made in detail to embodiments of the invention, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the present invention.

Electromagnetic signals (sometimes called electromagnetic waves) have an electric-field vector component and a magnetic-field vector component. A polarization of an electromagnetic signal is described by a shape and locus of an electric field vector for the electromagnetic signal in a plane orthogonal to a direction of propagation of the electromagnetic signal. The polarization of an electromagnetic signal may include linear polarization, elliptical polarization, right-hand elliptical polarization, left-hand elliptical polarization, right-hand circular polarization (RHCP) and left-hand circular polarization (LHCP).

In general, on reflecting or scattering off of an object, the polarization of the electromagnetic signal will change due to a change in a phase of the electromagnetic signal. Scattering includes specular reflection and diffuse scattering. Polarization change on specular reflection is a result of differences between Fresnel reflection coefficients for the object and a medium in which the electromagnetic signal is propagating, such as air. As is known in the art, Fresnel reflection coefficients are a function of a wavelength of the electromagnetic signal, an angle of incidence of the electromagnetic signal, complex indexes of refraction for the object and the medium, and anisotropy, if any, in the complex index of refraction of the object and/or the medium. Polarization change on diffuse scattering includes multiple scattering events due to a roughness of a surface of the object (for example, the bark of a tree) and multiple scattering events due to spatial inhomogeneities in the index of refraction through a volume of the object (for example, a tree, its limbs and leaves or foliage).

For an electromagnetic signal initially having RHCP or LHCP, clutter, such as a tree, will return an reflected electromagnetic signal having a primarily opposite circular polarization. In contrast, for the electromagnetic signal initially having RHCP or LHCP, a corner reflector, also known as a dihedral reflector, having two surfaces that are substantially perpendicular, will result in a return electromagnetic signal having primarily the initial circular polarization.

Some local positioning systems determine a position of a device by determining one or more ranges from the device to one or more objects having a known position. In some local positioning systems, the objects are landmarks. In some local positioning systems, the landmarks are passive reflectors, for example, dihedral reflectors. A challenge in local positioning systems using passive reflectors is to distinguish return electromagnetic signals corresponding to the passive landmarks and the return electromagnetic signals corresponding to other objects with a radar detection area of the local positioning system. In addition, it is often difficult to distinguish between natural objects and man-made objects, such as the passive landmarks.

In some local positioning systems, the landmarks are active landmarks. An active landmark receives an electromagnetic signal from the device and transmits a return electromagnetic signal. In some embodiments, the return electromagnetic signal has a polarization. The polarization of the return signal may be the same as or different than the polarization of the received signal.

Changes in the polarization of the electromagnetic signals upon reflection from landmarks and other objects can be used to help distinguish between reflections from landmarks and reflections from other objects. In particular, by transmitting an electromagnetic signal having a respective polarization and comparing a relative signal strength or signal power of a received signal, corresponding to the return electromagnetic signal having the same respective polarization (co-polarized) or an orthogonal polarization (cross-polarized), a characteristic of the object can be determined. For example, the determined characteristic may be the roughness of the object. This characteristic allows passive landmarks to be distinguished from other objects and allows man-made objects to be distinguished from natural objects.

For example, a ratio of cross-polarized (orthogonally polarized) signal strength to co-polarized (same polarization) signal strength may be determined. The ratio is very low for smooth surfaces and increases with surface roughness, peaking for surface roughness having features whose size is on the order of the wavelength of the electromagnetic signal. Similarly, the ratio will be high for multiple scattering events due to spatial inhomogeneities in the index of refraction through the volume of the object. For a smooth, passive dihedral reflector, however, the ratio will be low.

Figure 2:
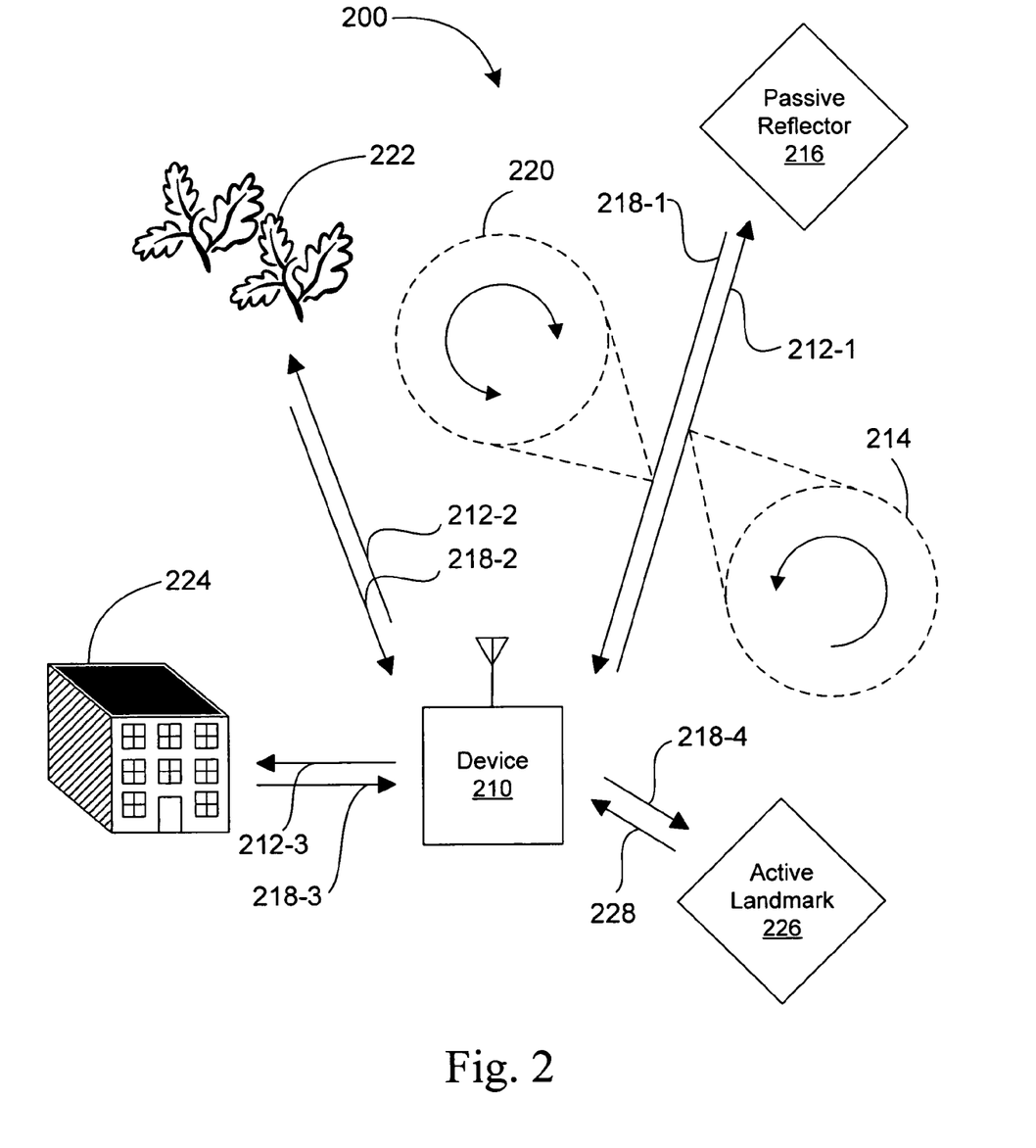
FIG. 2 illustrates an embodiment of the positioning system.

FIG. 2 illustrates an embodiment of a local positioning system 200. In some embodiments, the radar detection area of the system 200 may have a maximum dimension of 50 m, 100 m, 250 m, 500 m, 1000 m, 5000 m or 10,000 m. A device 210 transmits one or more electromagnetic pulses 212 having a carrier signal frequency and a first polarization 214, in this illustration LHCP. In other embodiments, the first polarization 214 is RHCP. In one embodiment, the electromagnetic pulse 212 is 1 nanosecond (ns) in duration and has a carrier signal frequency of 6 gigahertz (GHz). Other embodiments may employ electromagnetic pulse 212 duration and carrier signal frequency pairings of: 1 ns and 24 GHz, 5 ns and 6 GHz, and 1 ns and 77 GHz. Many other pulse durations and carrier signal frequencies may be used in yet other embodiments.

The electromagnetic pulses 212 are reflected by objects within the radar detection area of the system 200. Objects include passive reflector 216, foliage 222 and building 224. While FIG. 2 illustrates an embodiment with one device 210 and one passive reflector 216, some embodiments may have two or more devices, two or more passive reflectors or both. In some embodiments, the passive reflector 216 is a passive dihedral reflector or a passive corner cube reflector. The device 210 receives one or more return signals 218 including one or more return pulses over a period of time. A polarization 220 of a respective return signal (produced by the initial pulse(s) reflecting of a particular object), such as return signal 218-1 or 218-2, is either substantially the same as the first polarization 214 or has a second polarization substantially orthogonal to the first polarization 214. In some embodiments, the first polarization 214 is RHCP and the polarization 220 is either LHCP or RHCP. In some embodiments, the first polarization 214 is LHCP and the polarization 220 is either LHCP or RHCP. By comparing the relative signal strengths or signal power of return signals 218 that are co-polarized and cross-polarized, a characteristic of the object, such as the roughness of the object, may be determined. This allows the passive reflector 216, which has a smooth surface, to be distinguished from the foliage 222 and the building 224.

In particular, to generate a radar map of a particular region (e.g., near or surrounding the device 210), the device 210 transmits at least a first pulse, such as pulse 212-1, having the carrier signal frequency and the first polarization, such as polarization 214. The device receives a first return signal, such as return signal 218-1, preferentially having the first polarization, such as polarization 220. The first return signal includes at least a first return pulse. The device 210 processes the first return signal so as to isolate the first return pulse from the first return signal. The device also transmits at least a second pulse, such as pulse 212-2, having the carrier signal frequency and the first polarization. Note that the arrows for transmitted pulses 212 and return signals 218 in FIG. 2 are for illustrative purposes only and do not necessarily indicate that the pulses and return signals have specific directionality. In some embodiments, the transmitted pulses are isotropic, and in other embodiments, they are directionally focused.

The device receives a second return signal, such as return signal 218-2, preferentially having a second polarization, such as polarization 220, substantially orthogonal to the first polarization. The second return signal includes at least a second return pulse. The device 210 processes the second return signal so as to isolate the second return pulse from the second return signal. The device 210 determines one or more characteristics of the object in accordance with the relative signal strength of the first return pulse and the second return pulse. In some embodiments, the characteristic is the roughness of at least one surface of the object. In an exemplary embodiment, the first polarization is RHCP and the second polarization is LHCP. In another exemplary embodiment, the first polarization is LHCP and the second polarization is RHCP. In yet another embodiment, return signals having both polarizations are received substantially simultaneously in response to a transmitted pulse.

In a variation on the local positioning system 200, the objects may include at least one optional active landmark 226. The active landmark 226 returns an electromagnetic pulse 228 having the carrier signal frequency. The polarization 220 of the return electromagnetic pulse is either substantially the same as the first polarization 214 or has a second polarization substantially orthogonal to the first polarization 214. In some embodiments, the return electromagnetic pulse 228 has a second carrier signal frequency different from the carrier signal frequency. In some embodiments, the return electromagnetic pulse 226 is amplitude or frequency modulated. In some embodiments, the return electromagnetic pulse 226 is a square wave. In some embodiments, the return electromagnetic pulse 226 is encoded. For instance, the return electromagnetic pulse may be encoded using on-off keying, quadrature amplitude modulation, continuous phase frequency shift keying, frequency shift keying, phase shift keying, differential phase shift keying, quadrature phase shift keying, minimum shift keying, Gaussian minimum shift keying, pulse position modulation, pulse amplitude modulation, pulse width modulation, Walsh code modulation, Gold code modulation, Barker code modulation, pseudo-random-noise sequence modulation, or dc-free codes having an autocorrelation of 1 at zero time offset and substantially near zero at non-zero time offset. The use of an active landmark 226 allows the return electromagnetic pulse 228 to be distinguished at greater distances from the device 210 in the local positioning system 200.

Figure 1:
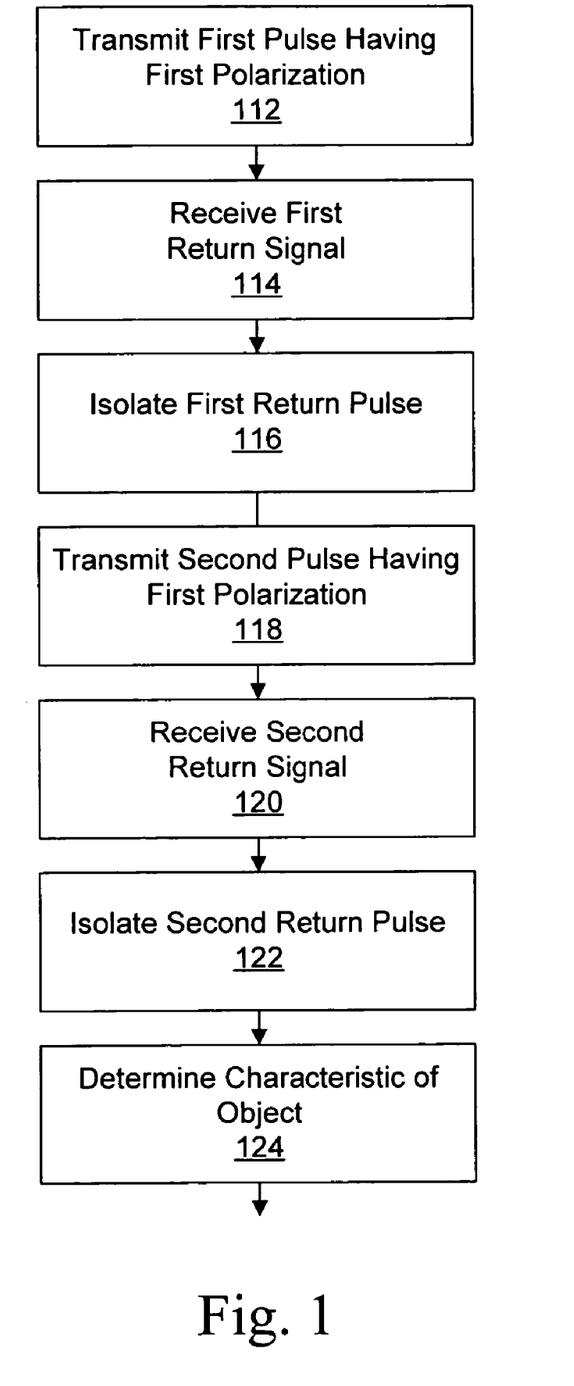
FIG. 1 is a flow chart illustrating the operations performed in an embodiment of a positioning system.

FIG. 1 is a flow chart illustrating an embodiment of the operations in a positioning system with co-polarized and cross-polarized radar mapping. A first pulse having the first polarization is transmitted 112. The first return signal including at least the first return pulse is received 114. The first return signal is processed so as to isolate the first return pulse 116. A second pulse having the first polarization is transmitted 118. The second return signal including at least the second return pulse is received 120. The second return signal is processed so as to isolate the second return pulse 122. The characteristic of an object is determined 124 in accordance with the relative signal strength of the first return pulse and the second return pulse.

Figure 3:
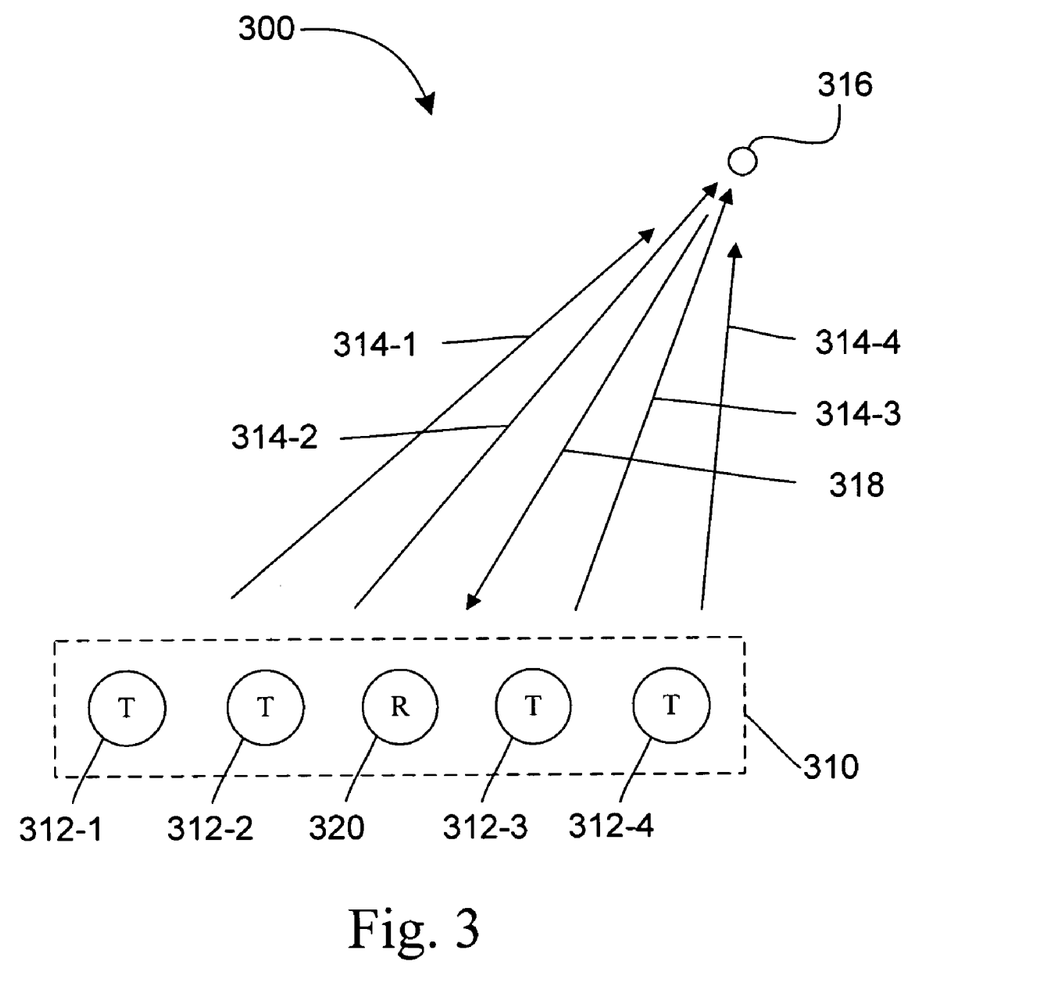
FIG. 3 illustrates an embodiment of the positioning system.

FIG. 3 is an illustration of an embodiment 300 of the positioning system. A device 310 includes a plurality of transmitters 312 and a receiver 320. The device 310 transmits at least a first set of pulses 314. The pulses 314 scatter off of object 316. The device 310 receives a return signal 318.

Figure 4:
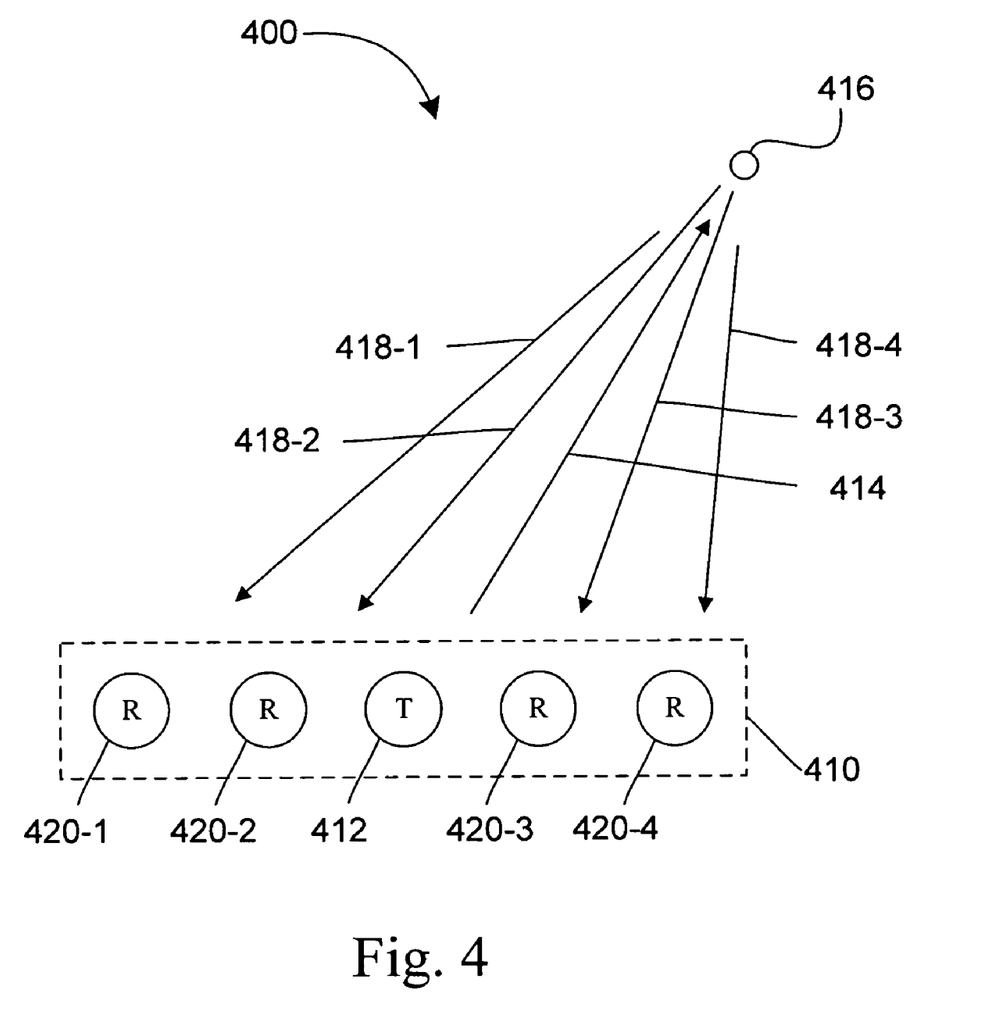
FIG. 4 illustrates an embodiment of the positioning system.

FIG. 4 is an illustration of an embodiment 400 of the positioning system. A device 410 includes one transmitter 412 and a plurality of receivers 420. The device 410 transmits at least a first pulse 414. The pulse 414 scatters off of object 416. The device 410 receives a set of return signals 418.

Figure 5:
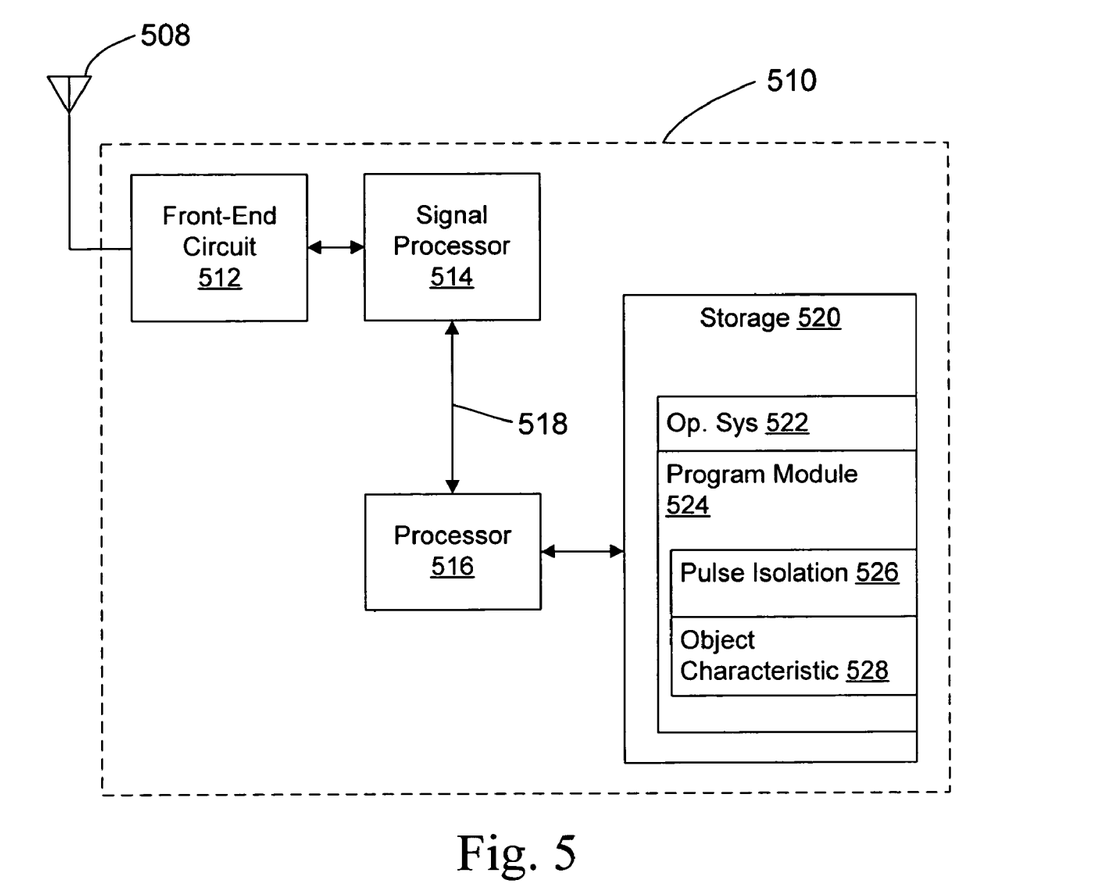
FIG. 5 is an illustration of typical components in a device in an embodiment of the positioning system.

FIG. 5 is an illustration of components in a typical device 510, such as device 210, device 310 and device 410, in an embodiment of the positioning system. One or more transmitters and one or more receivers in the device 510 are not shown. The device includes at least one antenna 508. In some embodiments, the device 510 may include at least one circularly polarized antenna. In some embodiments, the device 510 may include at least one polarizing antenna that is used to transmit and to receive. In one embodiment, the device 510 includes two antennas, one for the transmitting and receiving RHCP signals and another for transmitting and receiving LHCP signals.

The device 510 includes a front-end circuit 512 and a signal processor 514 for modifying one or more signals. The modifying may include amplification, filtering and/or removal of modulation coding. The device 510 includes one or more processing units (CPUs) 516, memory 520, and one or more communications buses 518 for connecting these components. In alternate embodiments, some or all of the functionality of the device 510 may be implemented in one or more application specific integrated circuits (ASICs), thereby either eliminating the need for the processing unit 516 or reducing the role of the processing unit 516. Memory 520 may include high speed random access memory and may also include non-volatile memory, such as one or more magnetic disk storage devices. Memory 520 may include mass storage that is remotely located from the processing unit 520.

Memory 520 stores an operating system 522 that includes procedures for handling various basic system services for performing hardware dependent tasks. Memory 520 also stores one or more program modules 524. The program module 524 includes pulse isolation module or set of instructions 526 to isolate one or more pulses from the return signals. The program module 524 also includes an object characteristic determination module or set of instructions 528 to determine the object characteristic in accordance with the relative signal strengths of co-polarized and cross-polarized return signals.

The modules or set of instructions in memory 520 are executed by the processing unit 516. In addition, the device 510 may include executable procedures, sub-modules, tables and other data structures (not shown). In some embodiments, additional or different modules and data structures may be used and some of the modules and/or data structures listed above may not be used. In some embodiments, the capabilities of the device 510 may be implemented more in hardware and less in software, or less in hardware and more in software, as is known in the art.

The foregoing description, for purposes of explanation, used specific nomenclature to provide a thorough understanding of the invention. However, it will be apparent to one skilled in the art that the specific details are not required in order to practice the invention. The embodiments were chosen and described in order to best explain the principles of the invention and its practical applications, to thereby enable others skilled in the art to best utilize the invention and various embodiments with various modifications as are suited to the particular use contemplated. Thus, the foregoing disclosure is not intended to be exhaustive or to limit the invention to the precise forms disclosed. Many modifications and variations are possible in view of the above teachings.

It is intended that the scope of the invention be defined by the following claims and their equivalents.

What is claimed:

1. A method of determining position performed by a mobile local positioning system, comprising:
    transmitting at least a first electromagnetic pulse having a carrier signal frequency and a first polarization from a mobile device;
    receiving a first return signal over a respective period of time, wherein the first return signal includes at least a first return pulse from a landmark having a known position within a radar detection area of the positioning system, and the receiving includes preferentially receiving signals having the first polarization;
    processing the first return signal so as to isolate the first return pulse from the first return signal;
    transmitting a second electromagnetic pulse having the carrier signal frequency and the first polarization from the device;
    receiving a second return signal over a respective period of time, wherein the second return signal includes a second return pulse from the landmark within the radar detection area of the positioning system, and the receiving includes preferentially receiving signals having a second polarization;
    processing the second return signal so as to isolate the second return pulse from the second return signal;
    determining a range to and a characteristic of the landmark in accordance with a relative signal strength of the first return pulse and the second return pulse; and
    determining a position of the mobile device based on the range to the landmark.

2. The method of claim 1, wherein the first polarization is right-hand circular polarization and the second polarization is left-hand circular polarization.

3. The method of claim 1, wherein the first polarization is left-hand circular polarization and the second polarization is right-hand circular polarization.

4. The method of claim 1, further comprising using a same polarized antenna for both the transmitting and receiving.

5. The method of claim 1, wherein transmitting from the device uses one transmitter and receiving in the device uses a plurality of receivers.

6. The method of claim 1, wherein transmitting from the device uses a plurality of transmitters and receiving in the device uses one receiver.

7. The method of claim 1, wherein the landmark is an active landmark.

8. The method of claim 1, wherein the landmark is a passive reflector.

9. The method of claim 1, wherein the characteristic of the landmark is a roughness of at least one surface of the landmark.

10. A mobile local positioning system, comprising:
    a mobile device configured to transmit at least a first electromagnetic pulse having a carrier signal frequency and a first polarization, to receive a first return signal including at least a first return pulse from a landmark having a known position, located within a radar detection area of the positioning system, over a respective period of time, to process the first return signal so as to isolate the first return pulse from the first return signal, to transmit at least a second electromagnetic pulse having the carrier signal frequency and the first polarization, to receive a second return signal including a second return pulse from the landmark over a respective period of time, to process the second return signal so as to isolate the second return pulse from the second return signal, and to determine a range to and a characteristic of the landmark in accordance with a relative signal strength of the first return pulse and the second return pulse,
    wherein the device preferentially receives the first return signal having the first polarization and the second return signal having a second polarization; and
    the mobile device is configured to determine a position of the mobile device based upon the range to the landmark.

11. The positioning system of claim 10, wherein the first polarization is right-hand circular polarization and the second polarization is left-hand circular polarization.

12. The positioning system of claim 10, wherein the first polarization is left-hand circular polarization and the second polarization is right-hand circular polarization.

13. The positioning system of claim 10, wherein the landmark is an active landmark.

14. The positioning system of claim 10, wherein the landmark is a passive reflector.

15. The positioning system of claim 14, in which the passive reflector is selected from the group consisting of a dihedral and a corner cube.

16. The positioning system of claim 10, the device further including at least one circularly polarized antenna.

17. The positioning system of claim 10, the device further including at least one polarizing antenna, wherein the device uses the polarizing antenna to transmit and to receive.

18. The positioning system of claim 10, the device further including a transmitter and a plurality of receivers, wherein the device transmits using the transmitter and the device receives using the plurality of receivers.

19. The positioning system of claim 10, the device further including a plurality of transmitters and a receiver, wherein the device transmits using the plurality of transmitters and the device receives using the receiver.

20. The positioning system of claim 10, the device further including a processor, wherein the processor processes the first return signal so as to isolate the first return pulse, processes the second return signal so as to isolate the second return pulse and determines the characteristic of the landmark in accordance with the relative signal strength of the first return pulse and the second return pulse.

21. The positioning system of claim 10, the device further including a processor, a memory and at least one program module, the at least one program module containing instructions for:
    isolating the first return pulse from the first return signal;

isolating the second return pulse from the second return signal; and determining the characteristic of the landmark in accordance with the relative signal strength of the first return pulse and the second return pulse.

22. The positioning system of claim 10, wherein the characteristic of the landmark is a roughness of at least one surface of the landmark.

* * * * *